United States Patent
Ledet

(10) Patent No.: US 10,659,415 B1
(45) Date of Patent: May 19, 2020

(54) SYSTEM PROCESSED EMOJIS

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

(21) Appl. No.: 15/910,086

(22) Filed: Mar. 2, 2018

Related U.S. Application Data

(63) Continuation of application No. 15/785,262, filed on Oct. 16, 2017.

(60) Provisional application No. 62/409,019, filed on Oct. 17, 2016.

(51) Int. Cl.
| | |
|---|---|
| *G06F 15/16* | (2006.01) |
| *H04L 12/58* | (2006.01) |
| *G06F 16/951* | (2019.01) |
| *G06F 3/0481* | (2013.01) |

(52) U.S. Cl.
CPC ............ *H04L 51/22* (2013.01); *G06F 16/951* (2019.01); *H04L 51/08* (2013.01); *G06F 3/0481* (2013.01)

(58) Field of Classification Search
CPC ....... H04L 51/22; H04L 51/08; G06F 16/951; G06F 3/0481
USPC ......................................................... 709/206
See application file for complete search history.

(56) References Cited

U.S. PATENT DOCUMENTS

| | | | |
|---|---|---|---|
| 5,873,107 A | 2/1999 | Borovoy et al. | |
| 5,928,325 A | 7/1999 | Shaughnessy et al. | |
| 8,286,085 B1 | 10/2012 | Denise | |
| 8,577,422 B1 | 11/2013 | Ledet | |
| 9,336,674 B1 | 5/2016 | Thirumalaisamy | |
| 9,998,885 B2 | 6/2018 | Shelkovin et al. | |
| 2002/0016818 A1 | 2/2002 | Kirani et al. | |
| 2003/0184587 A1* | 10/2003 | Ording .................. | G06F 3/0486 715/769 |
| 2006/0086799 A1 | 4/2006 | Robertson et al. | |
| 2007/0043866 A1 | 2/2007 | Garbow et al. | |
| 2007/0180035 A1 | 8/2007 | Liu et al. | |
| 2008/0028323 A1 | 1/2008 | Rosen et al. | |
| 2008/0160960 A1 | 7/2008 | ElRif et al. | |
| 2009/0019119 A1 | 1/2009 | Scheffler | |
| 2009/0049139 A1 | 2/2009 | Fouotsop et al. | |
| 2009/0249226 A1 | 10/2009 | Manolescu et al. | |
| 2009/0271486 A1 | 10/2009 | Ligh et al. | |
| 2010/0287183 A1 | 11/2010 | Kamireddy et al. | |

(Continued)

OTHER PUBLICATIONS

Zhi-Hui Wang, The Duc Kieu, Chin-Chen Chang and Ming-Chu Li, "Emoticon-based text steganography in chat," 2009 Asia-Pacific Conference on Computational Intelligence and Industrial Applications (PACIIA), Wuhan, 2009, pp. 457-460. (Year: 2009).*

(Continued)

*Primary Examiner* — Taylor A Elfervig

(57) ABSTRACT

An example operation may include one or more of determining appropriate emojis on at least one user's originating device by interfacing with the application and data of the user's originating device, performing a search of the at least one user's data to obtain actions relevant to the at least one user of the system, determining an action associated with the emoji, setting at least one of the determined emojis as a system emoji, and transmitting the determined emojis from the user's originating device to a system network as an emoji stream.

20 Claims, 7 Drawing Sheets

(56) References Cited

U.S. PATENT DOCUMENTS

| | | | |
|---|---|---|---|
| 2011/0071832 A1* | 3/2011 | Handa | G10L 15/26 704/246 |
| 2012/0149404 A1 | 6/2012 | Beattie et al. | |
| 2012/0209871 A1 | 8/2012 | Lai et al. | |
| 2012/0226707 A1 | 9/2012 | Brun et al. | |
| 2012/0303452 A1 | 11/2012 | Xue et al. | |
| 2013/0080545 A1 | 3/2013 | Datta | |
| 2013/0097270 A1 | 4/2013 | Plotkin | |
| 2013/0159830 A1 | 6/2013 | Lee et al. | |
| 2014/0201264 A1 | 7/2014 | Soon-Shiong | |
| 2015/0052213 A1 | 2/2015 | Kau et al. | |
| 2015/0089417 A1 | 3/2015 | Dayan | |
| 2015/0248389 A1 | 9/2015 | Kahn et al. | |
| 2015/0310072 A1 | 10/2015 | Dietz et al. | |
| 2016/0099896 A1 | 4/2016 | Huang | |
| 2016/0150433 A1 | 5/2016 | Bergquist et al. | |
| 2016/0173424 A1 | 6/2016 | Fuhrmann | |
| 2016/0212208 A1 | 7/2016 | Kulkarni et al. | |
| 2016/0343062 A1 | 11/2016 | Morton et al. | |
| 2017/0078232 A1 | 3/2017 | Faruk et al. | |
| 2017/0093776 A1 | 3/2017 | Dixon | |
| 2017/0118189 A1* | 4/2017 | Venkatakrishnan | H04L 51/18 |
| 2017/0134456 A1 | 5/2017 | McDonnell et al. | |
| 2017/0187654 A1 | 6/2017 | Lee | |
| 2017/0286755 A1* | 10/2017 | Kaletsky | G06F 17/24 |
| 2017/0331769 A1* | 11/2017 | Curry | H04L 51/10 |
| 2017/0345079 A1 | 11/2017 | Rangan et al. | |
| 2017/0364866 A1 | 12/2017 | Steplyk et al. | |
| 2018/0048595 A1 | 2/2018 | Dotan-Cohen et al. | |
| 2018/0048606 A1 | 2/2018 | Goslar | |
| 2019/0034451 A1 | 1/2019 | Nayak et al. | |

OTHER PUBLICATIONS

V. Iranmanesh, H. Jing Wei, S. Lee Dao-Ming and O. A. Arigbabu, "On using emoticons and lingoes for hiding data in SMS," 2015 International Symposium on Technology Management and Emerging Technologies (ISTMET), Langkawai Island, 2015, pp. 103-107. (Year: 2015).*

T. Ahmad, G. Sukanto, H. Studiawan, W. Wibisono and R. M. Ijtihadie, "Emoticon-based steganography for securing sensitive data," 2014 6th International Conference on Information Technology and Electrical Engineering (ICITEE), Yogyakarta, 2014, pp. 1-6. (Year: 2014).*

Anonymous,Superuser, "Message with Drop-Down/Component", Jan. 2016, Internet—Superuser, https://superuser.com/questions/1027985/ message-with-drop-down-combobox, p. 1-5 (Year: 2016).

* cited by examiner

| Emojis | Description | Examples |
|---|---|---|
| Documents — 210 | Files that are utilized in users' interactions | |
| Actions — 220 | Actions that are normally performed with users | |
| Participants — 230 | Users in the system | |

SYSTEM PROCESSED EMOJIS

CROSS REFERENCE TO RELATED APPLICATION

This application is a continuation of U.S. application Ser. No. 15/785,262, filed Oct. 16, 2017, entitled DATA INTERACTION WITH MESSAGES, which claims the benefit of U.S. Provisional Application No. 62/409,019, filed Oct. 17, 2016, entitled MESSAGING, the disclosures of which are incorporated in their entirety herein by reference.

FIELD

The present application generally relates to the use of business emojis and more specifically relates to system processed emojis.

BACKGROUND

Computer systems are regularly developing new methods of interacting with users to improve the user experience and facilitate new functionality.

The present application relates to methods and systems utilizing clickable emojis for directing a system to perform certain actions. Due to advances in hardware and the emergence of efficient messaging technologies, conversation and communication of textual, vocal and graphical messages between parties has gained wide spread popularity. Instant messaging, short messaging service (SMS), email, chat room and other forms of containing emojis/emoticons using short messaging service SMS and multimedia messaging service (MMS).

An emoji/emoticon is a meta-communicative pictorial representation of a facial expression that, in the absence of body language serves to draw a receiver's attention to the tenor of a sender's non-verbal communication. An emoji/emoticon is a small digital picture or pictorial symbol that represents a thing, feeling, concept, etc., used in text messages and other electronic communications and usually part of a standardized set.

During the last decade, the diversity of existing emojis/emoticons has increased substantially, from just a few basic combinations of a "smiley face" to an overabundance of complex and rich graphical and sometimes even animated emojis/emoticons. However, current image-based communication options, while popular, are still lacking gaps when it comes to utilizing them for business communication. Furthermore, emojis are still relatively static with respect to content being added to a message. This has led to a hindrance in emojis being linkable to additional content and has prevented users from creating and distributing personalized image-based communication via a variety of mobile platforms, applications and devices, particularly when it relates business based communication.

SUMMARY

Embodiments of the present application provide systems and methods of utilizing clickable image-based communication in messages shared between two or more client devices.

Accordingly, the present application discloses an improved means of utilizing emojis for communication between two or more client devices.

An application executing on a client device presents emojis wherein these emojis may be utilized to direct a system to perform particular actions initiated by interactions with the emojis. Certain embodiments are disclosed that offer examples depicting various scenarios wherein business emojis are utilized to initiate particular actions by the system. There are many possible actions that may be initiated by the system and the current disclosure seeks to depict a subset of the possible interactions with the understanding that many other interactions may be possible using the principles disclosed herein.

One versed in computer software design and development may use these principles to design other, similar interactions without deviating from the scope of the current application.

Certain embodiments of the application discuss how the system determines appropriate emojis, how the to be sent emojis are selected by a user, how the actions to be executed are defined by the application, how the emojis are sent to an intermediary system network, how the emojis are processed by the system network and how the emojis are transmitted to a final recipient.

Further embodiments discuss obtaining relevant action particular to the user of the system In still further embodiments, modifying an emoji to be a system emoji are discussed. In yet another embodiment, discusses how a system emoji performs the actions of the emoji.

Another example embodiment may include a method comprising one or more of determining appropriate emojis on at least one user's originating device by interfacing with the application and data of the user's originating device, performing a search of the at least one user's data to obtain actions relevant to the at least one user of the system, determining an action associated with the emoji, setting at least one of the determined emojis as a system emoji, and transmitting the determined emojis from the user's originating device to a system network as an emoji stream.

Another example embodiment may include a system comprising at-least one processor, and a software agent operated by the processor and configured to perform one or more of determine appropriate emojis on at least one user's originating device that interfaces with the application and data of the user's originating device, perform a search of the at least one user's data to obtain actions relevant to the at least one user of the system, determine an action associated with the emoji, set at least one of the determined emojis as a system emoji, and transmit the determined emojis from the user's originating device to a system network as an emoji stream.

Another example embodiment may include a non-transitory computer readable medium is encoded with computer program instructions that when executed by one or more computers cause the one or more computers to perform one or more of determining appropriate emojis on at least one user's originating device by interfacing with the application and data of the user's originating device, performing a search of the at least one user's data to obtain actions relevant to the at least one user of the system, determining an action associated with the emoji, setting at least one of the determined emojis as a system emoji, and transmitting the determined emojis from the user's originating device to a system network as an emoji stream.

Another example embodiment may include a method comprising one or more of determining appropriate emojis on at least one user's originating device by interfacing with the application and data of the user's originating device, performing a search of the at least one user's data to obtain actions relevant to the at least one user of the system, determining an action associated with the emoji, setting at least one of the determined emojis as a system emoji, forwarding the determined emojis from the user's originating device to a system network as an emoji stream, processing by the system network of an incoming emoji stream to convert it into an outgoing emoji stream, and transmitting the converted emoji stream to at least one recipient device.

Another example embodiment may include a system comprising at-least one processor, and a software agent operated by the processor and configured to perform one or more of determine appropriate emojis on at least one user's originating device by that interfaces with the application and data of the user's originating device, perform a search of the at least one user's data to obtain actions relevant to the users of the system, determine an action associated with the emoji, set at least one of the determined emojis as a system emoji, forward the determined emojis from the user's originating device to a system network as an emoji stream, process by the system network of an incoming emoji stream to convert it into an outgoing emoji stream, and transmit the converted emoji stream to at least one recipient device.

Another example embodiment may include a non-transitory computer readable medium is encoded with computer program instructions that when executed by one or more computers cause the one or more computers to perform one or more of determining appropriate emojis on at least one user's originating device by interfacing with the application and data of the user's originating device, performing a search of the at least one user's data to obtain actions relevant to the users of the system, determining an action associated with the emoji, setting at least one of the determined emojis as a system emoji, forwarding the determined emojis from the user's originating device to a system network as an emoji stream, processing by the system network of an incoming emoji stream to convert it into an outgoing emoji stream, and transmitting the converted emoji stream to at least one recipient device.

Reference in the specification to one embodiment or an embodiment means that a particular feature, structure or characteristic described in connection with the embodiment is included in at least one embodiment of the application. The appearance of the phrase "in one embodiment" in various places in the specification do not necessarily refer to the same embodiment.

Additional aspects of the application will be set forth in part in the description which follows, and in part will be obvious from the description, or may be learned by practice. The aspects of the application will be realized and attained by means of the elements and combinations particularly pointed out in the appended claims. It is to be understood that both the foregoing general description and the following detailed description are exemplary and explanatory only and are not restrictive of the application, as claimed.

The present application will now be described with reference to the following drawings, in which like reference numbers denote the same element throughout.

BRIEF DESCRIPTION OF THE DRAWINGS

The accompanying drawings, which are incorporated into and constitute a part of this specification, illustrate one or more embodiments of the present application and, together with the detailed description, serve to explain the principles and implementations herein.

In the drawings:

FIG. 2 is a diagrammatic, illustrative view depicting a table of a preferred embodiment of the present application.

DETAILED DESCRIPTION

Embodiments of the present application are described herein in the context of a system of computers, servers, and software. Those of ordinary skill in the art will realize that the following detailed description of the present application is illustrative only and is not intended to be in any way limiting. Other embodiments of the present application will readily suggest themselves to such skilled persons having the benefit of this disclosure. Reference will now be made in detail to implementations of the present application as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming but would nevertheless be a routine undertaking of engineering for those of ordinary skill in the art having the benefit of this disclosure. In addition, anywhere the word user appears, it means the user client device(s), the user device(s), and/or any device containing a memory and processor interacted with in some fashion by the user.

Figure 1:
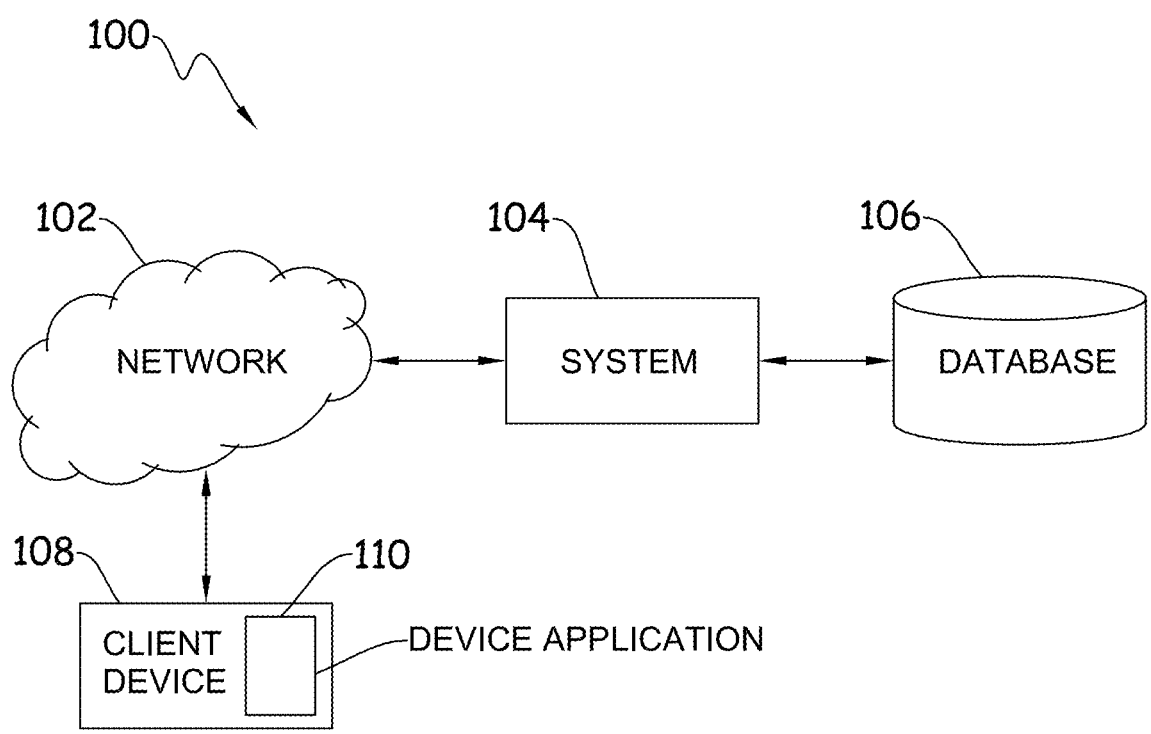
FIG. 1 is a block diagram of a system environment in accordance with an embodiment of the present application.

Referring now to the figures, FIG. 1 displays a system 100 of the present application, in one embodiment. The present application, in the form of software for example 110, executes on a device 108, or is accessible by the device 108 in a network 102 and/or a device communicably coupled to the network, such as system 104 and database 106. The device 108 may be a mobile device, a tablet computer, a laptop or desktop computer, a transport navigational computer, a wearable device, or any other similar or dissimilar device containing a processor and memory. It may also be a gaming system, a DVD player, or any device that is normally utilized to consume media. Or the present application, in the form of software, for example may reside on the device 108 that may be any of a mobile laptop device and/or a personal desktop computer, a wearable device, a mobile device or any other device containing a processor and memory. The device may be connected to the network 102 (which may be the Internet or any other type of network).

In some embodiments, there may exist multiple client devices 108, and may be directly connected to the system 104.

The system 104 may be a server computer or any similar type of device containing a memory and processor and directly or remotely connected to the network, or Internet 102. There may be a database 106 that also may be directly connected to the system 104 and/or the network 102.

In other embodiments, all or part of the software of the current application may reside on the client device(s) 108, the system 104, the database 106, and/or on another element of the system containing a processor and memory (not depicted) either directly connected to the shown elements of the system or connected through the network 102 wherein messaging to and from the said elements are routed through the network.

Any element described or depicted herein can constitute more than one like element. For example, server 104 can constitute multiple servers. Also, the system may exist entirely or in part in any of the elements in the system diagram, for example the client device 108.

Determining Emojis

In one embodiment, the system 104 determines appropriate emojis for the current environment by interfacing with applications and data of the users of the system wherein the interactions are noted and the documents, users and actions are stored in the system. These stored elements may be stored internal to the system 104, or stored in a remote database 106 and/or any other device containing a processor and memory.

There are at least 3 types of emojis determined in the current application:

a. People—users of the system whom interact with data
b. Actions—actions performed by users on data in the system
c. Data—elements in the system wherein actions are preformed via users, for example.

Other types of emojis may be determined by one versed in software design that interact with the current application without deviating from the scope of the current application.

In another embodiment, files either in the file system on the client device 108 or files accessible from the client device can be utilized as emojis in the current application. The interaction between the current application and the files on the client device may occur through drag-and-drop functionality. Through drag-and-drop functionality, a pointing device clicks on a file and holds down the pointing device while dragging the pointing device to another area on the display of the client device. The dragged file is then released or dropped where the file is desired. If the file is dropped over another application, then the application may receive the file as input if said application is programmed to do so.

In the current application, when a file is dropped over the application, the file becomes an emoji in the current emoji stream.

Searching Messages

The system 104 performs functionality to obtain the actions of the users of the system. These actions are then used in action emojis.

For example, via interactions with common messaging Application Programming Interfaces (APIs), it is possible to search through all messages of a particular user with a provided search query:

```
private void toFieldComponent( ){
    JTextField toField=new JTextField( );
    toField.addFocusListener(new CustomFocusListener( ));
    controlPanel.add(toField);
    mainFrame.setVisible(true);
}
class CustomFocusListener implements FocusListener{
    public void focusGained(FocusEvent e) {
    statusLabel.setText(statusLabel.getText( )
    +e.getComponent(  ).getClass(  ).getSimpleName(
        )+"gained focus.");
    }
    public void focusLost(FocusEvent e) {
    statusLabel.setText(statusLabel.getText( )
    +e.getComponent( ).getClass( ).getSimpleName( )+"lost
        focus.");
    sendMessage(originator, recipients[ ]);
}
```

The code above uses an input string "query" to search through a user's Gmail messages obtained via a ListMesasgesResponse.getMesasges( ) method call. Through this functionality, it is possible to search for user's messages for a matching string such as another user's name, a topic, an event, etc.

For example, the system 104 in searching the messages of a user for the string "meeting", it is possible to obtain any message wherein a meeting was mentioned. If the number of elements returned in the query is greater than a specified number, i.e. a static value, then it is assumed that the user normally engages in meetings and therefore may utilize an action emoji referencing requesting a meeting event. Other queries may be programmed wherein the results will determine many different emojis without deviating from the scope of the current application.

Searching Calendar Events

The searching of a user's events such as calendar items may help to understand the interactions with the user, as well as determine action and other emojis.

In an alternate embodiment, location emojis are determined according to the location of normal calendar events wherein the location of a proposed event is determined by the location emoji in the emoji stream. The location emoji contains the coordinates, description, media present, etc. of the location, such as a conference room for example.

A user's calendar data is accessible via common calendar APIs.

For example, to obtain the user's events in a calendar for a user in a particular domain including the data associated with the event(s), the following code may be used:

```
public List<Event> getCalendarEventsForUserAndDates(String userEmail, Long dateFrom, Long dateTo) {
    try {
    String pageToken=null;
    List<Event>allEvents=Lists.newArrayList( );
    do {
        ArrayMap<String, Object>parameters=new
            ArrayMap<String, Object>( );
        parameters.add("xoauth requestor_id", userEmail);
        Calendar.Events.List
            list=calendarApiBean.getCalendarApi( )
            .events( ).list("primary");
        list.setTimeMax(new DateTime(dateFrom, 0))
            .setTimeMin(new DateTime(dateTo, 0))
            .setUnknownKeys(parameters);
        Events events=list.setPageToken(pageToken)
            .execute( );
        List<? extends Event>items=events.getItems( );
        if (items !=null) {
```

```
    allEvents.addAll(items);
    }
    pageToken=events.getNextPageToken( );
} while (pageToken !=null);
return allEvents;
} catch (IOException e) {
logger.error("error while retriving calendar events for { }
    and dates
    { } { }", userEmail, dateFrom, dateTo);
logger.error("exception", e);
return Collections.emptyList( );
    }
}
```

The above code depicts code that may be utilized to obtain scheduled events in a user's calendar application. The function "getCalendarEventsForUserAndDates" takes three parameters:
a. The user's email
b. A starting date
c. An Ending date These parameters may be modified to obtain the data pertaining to any particular events desired.

An array is created, "allEvents" that is an array of objects. The variable is instantiated with a new array list.

An API is called "getCalendarAPI" off of the Calendar.APIBeant object. This method returns the events in the user's calendar, loading the data into a variable "list". The variable is cast as a Calendar.Events.List.

The particular items in the events are loaded into a variable "items" via an event.getItems( ) call and the items are added to the previously declared "allEvents" array. This is performed for all events in the user's calendar via a while loop, using pageToken to traverse through all events.

Finally, the array "allEvents" is returned in the function. As an example, the following event data may be obtained:
```
{
    "kind": "calendar # events",
    "etag": etag,
    "summary": string,
    "description": string,
    "updated": datetime,
    "timeZone": string,
    "accessRole": string,
    "defaultReminders": [
    {
        "method": string,
        "minutes": integer
    }
    ],
    "nextPageToken": string,
    "nextSyncToken": string,
    "items": [
    events Resource
    ]
}
```

The user's calendar data is obtained where attendees of upcoming meetings are examined to determine elements of an outgoing message, for example possible recipients. This data is utilized to determine interactions between the users of the system, usual calendar events, topics of calendar events, attendees of events, etc.

Emoji Description

In one embodiment, as displayed in FIG. 2, emojis are defined wherein the type, icon, action, etc. is determined. The defined emojis are for illustrative purposes only and serve to assist in the examples depicted of certain embodiments. Other types, icons, actions, etc. may be defined without deviating from the scope of the current application.

FIG. 2 depicts a possible description of implemented emojis. There are three types of emojis included: documents, 210, actions 220, and participants 230. Also included are icons that map to each emoji in each type, as displayed in 240. In another embodiment, an actual picture of a recipient may be included as an icon pertaining to the particular user.

Choosing Emojis

Figure 3A:
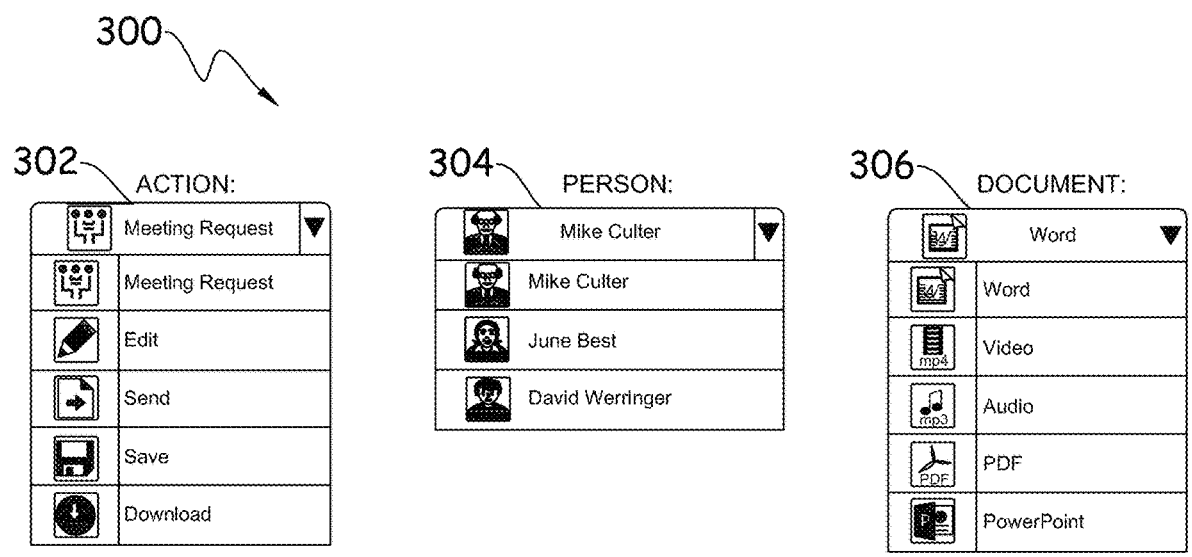
FIG. 3A is a diagrammatic view depicting an implementation of another embodiment of the present application as pertaining to choosing various emojis from drop down GUI components.

FIG. 3A is a GUI component layout 300 depicting an implementation of the current application wherein dropdown components are used to select different emojis. Users of the system 104 may want to toggle through the possible icons to be able to select which emojis are desired. In one embodiment, an application executing on the client device 108 has GUI components that allow the selection of emoji elements.

As one example, dropdown GUI components 302, 304, 306 are placed on a GUI display on a client device 108. The dropdown component items include those emojis that have been previously determined by the system 104, see above for more information.

Three GUI components are presented in FIG. 3A. Other components may be added and other components may be removed from these without deviating from the scope of the current application.

A first GUI dropdown component 302 includes emoji that are related to common actions performed by users of the system. In another embodiment, a basic set of emojis are available for use by the application via any of a numerous of selection components almost considered endless in choices.

By nature of example, a dropdown component 302 is presented wherein an item may be selected among the list of items shown. An explanation is provided, such as a short text description of the item allowing a user to easily understand each of the items. In another embodiment, a longer description is provided and in yet other embodiments, no description is provided.

A second dropdown component 304 is included that includes either a subset of all of the users in the system, or the complete group of users in the system. An image may also be included in the icon allowing easier recognition of the icon.

A third dropdown component 306 is included that pertains to document types wherein each document type is either included by the system by default or document types that have been utilized by user of the system via interactions, for example. Of course, many other types of document types may be included without deviating from the scope of the current application.

In another embodiment, sub document types may be included via a sub-menu element in the component 306. These are implemented by choosing one element in the dropdown list 306 wherein another dropdown list is displayed. This may continue indefinitely, allowing as many different types of document types desired. This sub-menu component may also be utilized on any of the other components 302, 304 or other components not depicted herein.

In another embodiment, the emojis may be selected via a file-selection component such as what is used when a file is selected in computing environment. In this scenario, the file is selected via a file-selection GUI component, then an emoji is selected based on the file extension of the selected file or the file type of the selected file.

Defining Emojis

Each emoji is designed as single structure wherein the attributes are encapsulated in a single object.

The presentation of the objects herein shows a basic implementation of the emoji object implementation wherein only the overall implementation of the emoji object is depicted without showing the full, functional coding implementation. This serves to show a high-level of implementation wherein the reader is able to understand the overall object oriented implementation such that an understanding of how the objects are utilized to create the objects and move the object across the network elements.

For example, the basic design of an emoji object using the Java programming language is as follows:

```
public class Emoji
    image emojiImage;
    String emojiName
Boolean systemEmojiStatus=FALSE
    void getImage( ) { }
    void setImage( ) { }
    void getEmojiName( ) { }
    void setEmojiName( ) { }
    void getSystemEmojiStatus( ) { }
    void setSystemEmojiStatus( ) { }
}
```

Every emoji in the system contains the elements as defined in the highest parent structure of emoji; all emojis have an image associated with them as well as a name as well as a status indicating whether the emoji is a system emoji. Using the object oriented nature of inheritance; each type of emoji inherits from the basic emoji object to add the specific nature of each emoji. For example, the action emoji is defined as: public class actionEmoji extends Emoji
```
    void performAction( ) {
    }
}
```

The actionEmoji has a method, performAction, allowing for a specific implementation of functionality for executing the action for each specific action emoji.

The person emoji is defined as:
```
public class PersonEmoji extends Emoji
    String userName;
    String emailAddress;
    String phoneNumber
    void getUserName( ) {
    }
    void getEmailAddress( ) {
    }
    void getPhoneNumber( ) {
    }
}
```

Each person emoji has attributes for the specific person, the person's user name, and email address and phone number.

The document emoji is defined as:
```
public class DocumentEmoji extends Emoji
    String fileName;
    void getFile( )
    }
}
```

Each document emoji contains a getFile( ) method wherein the file associated with the document (filename) is utilized to access the file, along with the attributes of the file including the file location in the device.

Sending Data Across the Network

Sending the data to a recipient or recipients allows for communication between the originator and recipient(s). Each emoji object that has been included in the emoji stream is packaged into an object referred to as an emojiPackage and sent across the network to a recipient or recipients.

An emoji stream is a group of emojis that have been included by the application executing on a client device 108. As emojis are added in the GUI executing on the application of the client device 108, the emojis are added to the emoji stream.

Figure 3B:
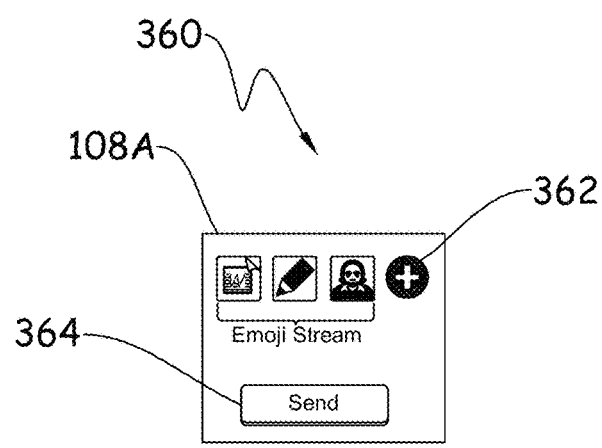
FIG. 3B is a diagrammatic view depicting another implementation of an embodiment of the present application as pertaining to the emoji stream.

FIG. 3B is a GUI shot 360 depicting an implementation of the current application of an emoji stream on a client device 108A. In another embodiment, there exists an "add" icon 362 that is placed at the end of an emoji stream that allows additional emojis to be added to the current emoji stream. Upon clicking the add emoji, a dropdown component is added in place of the add emoji wherein the new emoji may be selected. The add emoji 362 is moved to the end of the emoji stream.

Furthermore, as emojis are added to the emoji stream, they are internally added to an array of objects of the emoji class wherein each specific action/person/document emoji is a child of the emoji super class. Emoji[ ] emojiStream=new Emoji[5]; // assume maximum of 5 emojis in a stream When the first emoji is added to the emoji stream (the document emoji), the following code adds the document with the document location of "/user/documents/documentName.doc" to the emoji stream:
DocumentEmoji newDocument=new DocumentEmoji( );
newDocument.name="Word";
newDocument.image="wordImage";
newDocument.fileName="/user/documents/documentName.doc";
emojiStream[0]=newDocument;

The second emoji is added to the emoji stream as follows:
ActionEmoji newAction=new ActionEmoji( );
newAction.name="edit";
newDocument.image="editImage";
emojiStream[1]=newAction;

Finally, the third emoji is added to the emoji stream as follows:
PersonEmoji newPerson=new PersonEmoji( );
newPerson.userName="June Best";
newPerson.emailAddress="jbest@companyxyz.com";
newPerson.phoneNumber="5556667777";
emojiStream[2]=newPerson;

A "Send" button 364 is present that allows the emoji stream to be sent out of the client device 108 wherein the emoji stream is packaged into an emojiPackage and sent out. The phone number, email address, user name, or other similar attribute of the personEmoji in the emoji stream determines the recipient(s) wherein the emoji package is sent.

An emoji package contains an emoji stream, which is a collection of objects wherein each object is of type emoji as defined above. Either the phone number or the email address of the personEmoji determines the recipient(s) of the outgoing package. Therefore, to determine the outgoing message recipient, the following is used:
outgoingMessage.recipient=personEmoji.getPhoneNumber( );
outgoingMessage.recipient=personEmoji.getEmailAddress( );

Other elements may be used to deliver the package to a recipient, including the user's username, Internet Protocol (IP) address, etc. without deviating from the scope of the current application.

Clients Accessing the System

Figure 4:
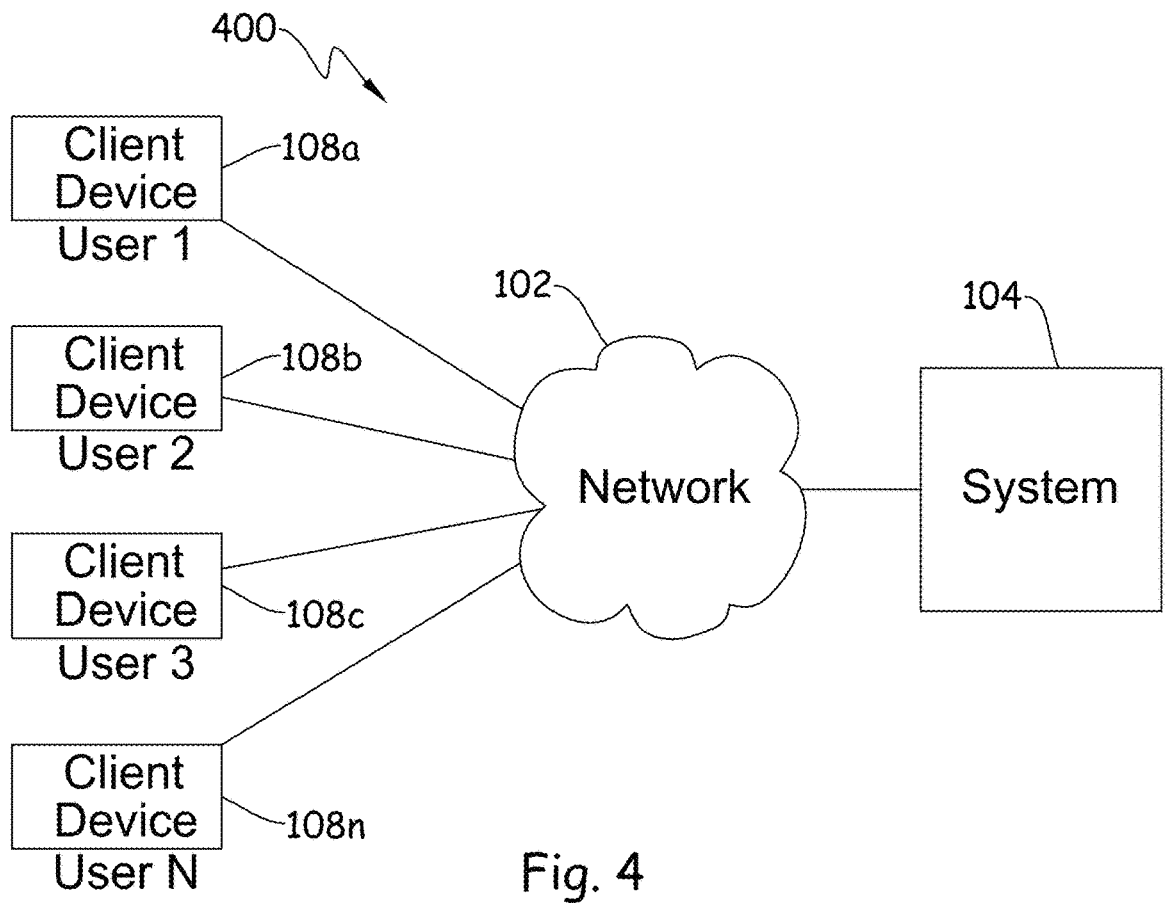
FIG. 4 illustrates a network diagram in accordance with one embodiment of the system.
Figure 5:
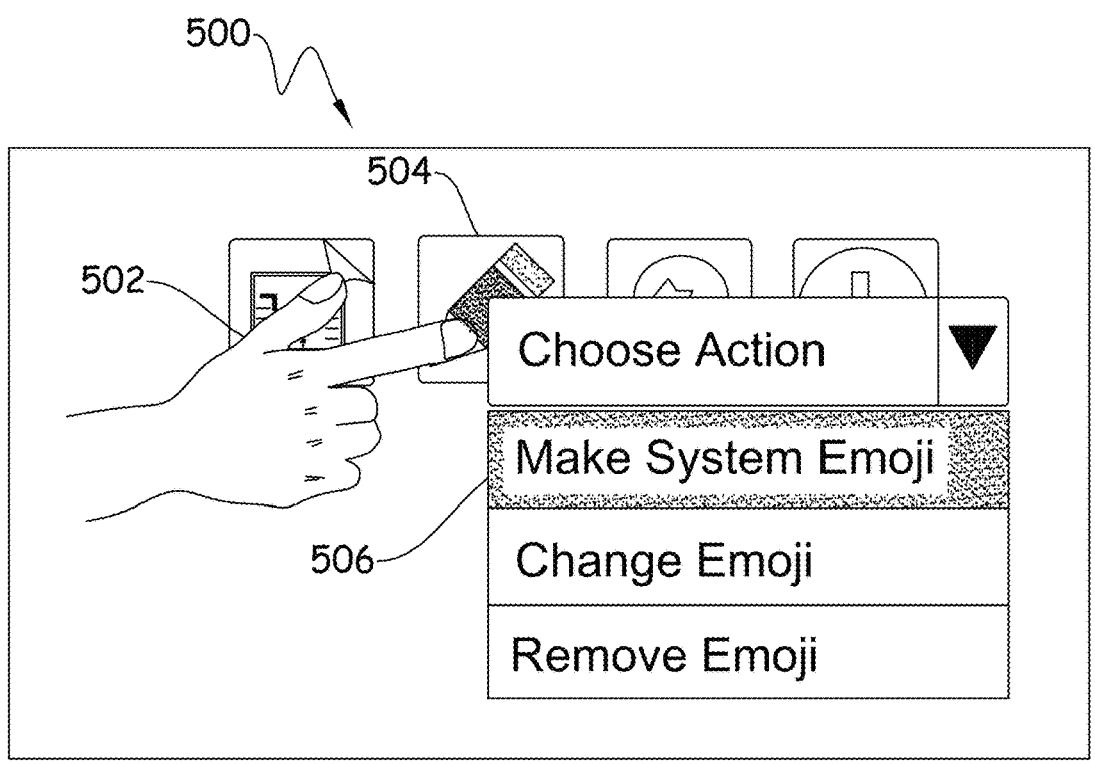
FIG. 5 illustrates an example scenario depicting choosing an action to be performed on an emoji.

FIG. 4 shows a network diagram 400 depicting one implementation of the current application. The system may reside entirely outside of the client devices 108 and connected through a network 102, or may reside partially or entirely in the client device(s) 108. In one implementation, it is preferable to have at least part of the system residing remotely to the client device(s) 108, as the system may need to obtain information from each of the client devices connected in the system. It is therefore possible that the functionality to obtain the information from client devices be present outside of those devices, and communicates through a network 102 to obtain data.

It is also advantageous to have logic inside each of the client devices 108. The logic to create the emoji stream(s) at both the originator and recipient(s) of the emoji message should reside, at least in part, in the client device to avoid unnecessary messaging between said client device and a potentially, completely remote system.

It is therefore described in the current application that a portion of the system reside in client device(s) 108 and a portion reside in a remote location, such as the system 104.

A similar argument may be made as to the location of a database 106. While the system must query a database for particular functionality, it is also necessary to retain some data in the client device 108.

For example, for data that pertains to multiple client devices of the architecture, it is preferable to have that data in a single repository, such as database 106.

For data that pertains to a single entity, such as that of a user of a client device 108, it is best to contain that data therein, Therefore, the current application may refer to data being accessed as being located both internally to that client device 108, and data contained in a remotely located repository, such as database 106, which is communicably coupled to a system 104, or may not be coupled to a system, but connected to a network 104 wherein messaging between the client(s) 108, the system 104, and any other element of the architecture communicate with the database through a network 104.

Determining a System Emoji

In one embodiment, to modify an emoji to be a system emoji, a pointing device 502 may long-press an emoji 504. As is commonly understood in computer programming, the long-press of a component throws an event that is caught by the application executing on the client device 108 wherein a method is executed. The functionality in the method in the current application creates a dropdown component with items added to the component.

As such, when the long-press occurs, a dropdown component 506 is displayed on the display of the client device wherein a choice of actions is presented.

There are three items:

Make System Emoji—alters the emoji object by calling emoji.setSystemEmojiStatus(true), and alters the emoji's presentation to indicate that the emoji is a system emoji.

Change Emoji—allows the changing of the emoji. A dropdown component 350 is drawn on the display of the client device 108 allowing for the selection of an alternate emoji.

Remove Emoji—allows for the removal of the emoji from the emoji stream. The emojis to the right of the removed emoji are moved down.

System Emojis Description

The current application seeks to handle the situation wherein certain emojis (referred to herein as business emojis) retain specific functionality; mainly the system 104 performs an action based on the emoji.

For reference, this certain emoji is henceforth referred to as a system emoji. Flows depicted below show how to activate a system emoji, how the emoji is processed in the system 104, and finally the delivery of the content created by the system to a final recipient, or recipients.

There are two streams of emojis referred to herein: emojiStream1 and emojiStream2. EmojiStream1 is the group of emojis that are queued in the originator's client device, henceforth referred to as user 1 108*a*, and emojiStream2 is the delivered emoji stream at the recipient's client device, henceforth referred to as user 2 108*b*.

There are different functionalities possible in the processing of system emojis. The current disclosure seeks to outline some of the scenarios to provide an overall understanding of how system emojis function while not providing every possible scenario. One versed in software design and development will easily be able to design other functionalities without deviating from the scope of the current application.

System Emojis Parsing

System emojis are received by the client device(s) of the recipient(s) wherein the object of the system emoji has the systemEmojiStatus attribute set to true. The processing of a system emoji differs from that of a regular emoji. As such, a system emoji will perform an action of the emoji on another emoji or emojis depending on the action of the said system emoji.

For example, an insert action emoji performs an action of joining content from the emoji following the action emoji to the document preceding the action emoji. A meeting request action emoji will request a meeting with the person emoji following the action emoji. An edit emoji will request that the document emoji following the action emoji be edited. A download emoji will request that the document emoji following the action emoji be downloaded.

The following table describes the behaviors of how certain emojis are processed:

| Emoji Type | Emoji | Related Emojis | Description |
|---|---|---|---|
| Person to perform the emoji preceding follows the emoji, requestor of the | Image/ Depiction | Emoji preceding | The person emoji is action of the action the emoji |
| | | Emoji following | If a person emoji that person is the action |
| Action related to the preceding the emoji take place between person emoji | Meeting Request | Emoji preceding | The meeting is to be document emoji |
| | | Emoji following | The meeting is to the originator and the following the emoji |
| uses the preceding source to be performed following the uses a document emoji as a source action. | Edit/Send/ Save/DL | Emoji preceding | The edit function document emoji as |
| | | Emoji following | The edit function is by the person emoji emoji |
| | Insert | Emoji preceding | The insert function emoji preceding the document for the |
| uses a document emoji as content | | Emoji following | The insert function emoji following the to insert. |
| Document emoji is used as action of the action | Document Type | Emoji preceding | No relation |
| | | Emoji following | If action emoji, the the source for the emoji. |

Further Interactions with Emojis

Figure 6:
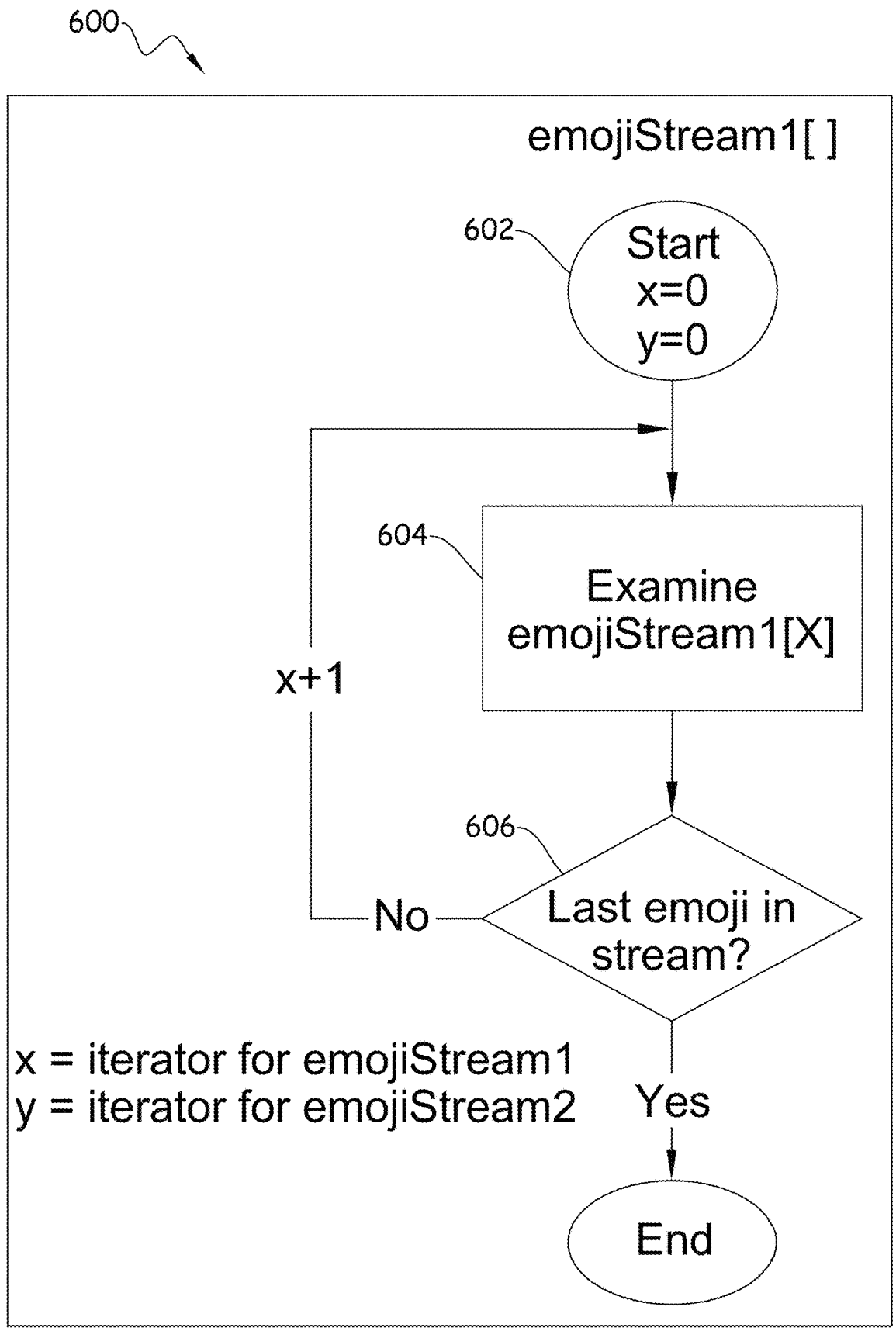
FIG. 6 illustrates a flowchart processing an emoji stream.

FIG. 6 is a flowchart of the overall processing of an incoming emoji stream 600 at the system 104 in one implementation of the current application. The input is a emoji stream, emojiStream1[ ] containing the emojis received.

There are to iterators, "x" and "y" both set to 0, 602. Each emoji is examined emojiStream1[x] where "x" is incremented with each loop 604. After the emoji is examined, a check is made if that emoji is the last emoji 606. If it is not the last emoji, the iterator, "x", is incremented and the loop begins again. If the emoji is the last emoji, then the process ends.

The details of the logic to examine each emoji (emojiStream1[x]) follows.

Figure 7:
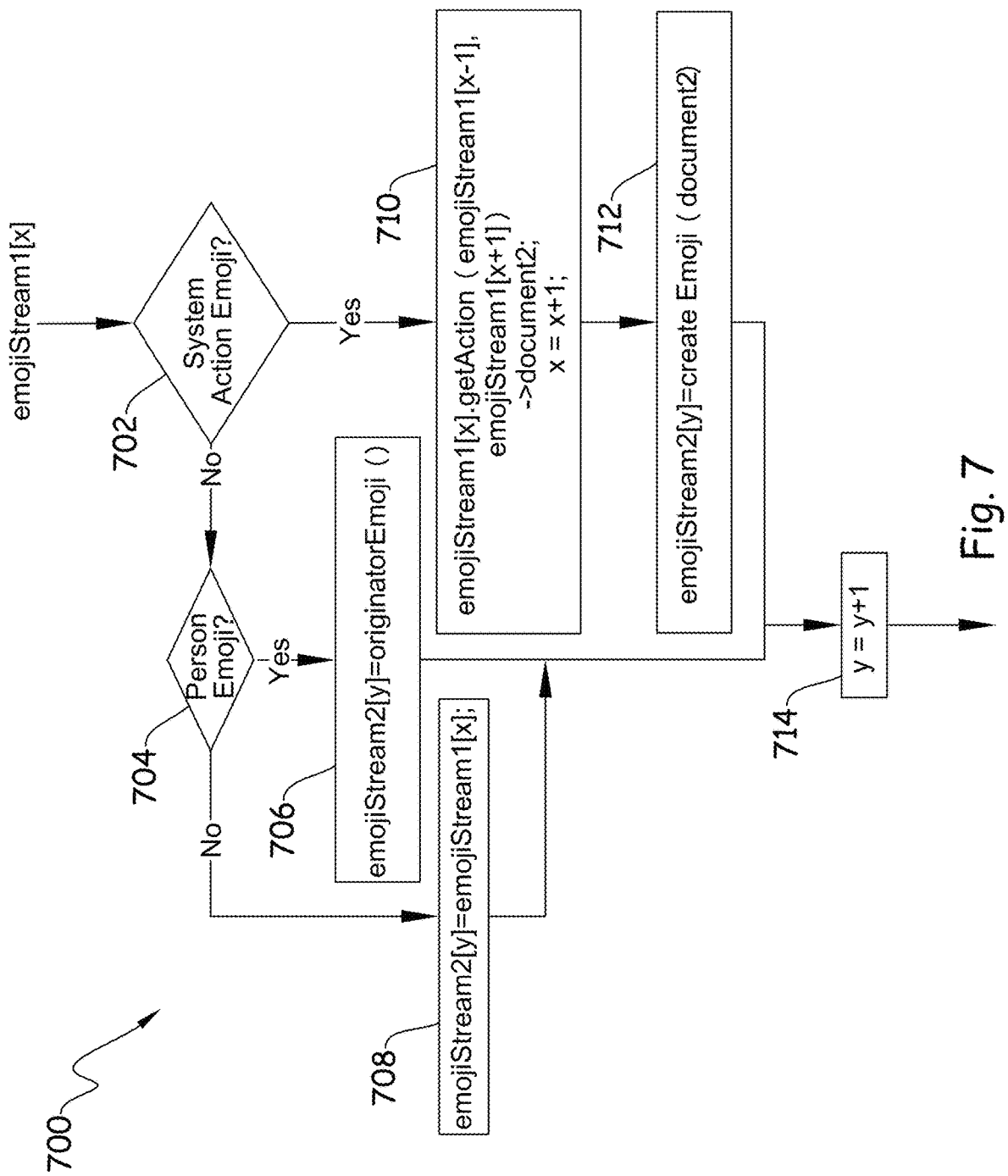
FIG. 7 illustrates a further flow chart of processing an emoji stream.

FIG. 7 is a flowchart of the processing of a emoji stream 700 at the system 104 in one implementation of the current application. An emoji (emojiStream1[x]) is input into the process. A first check is made if the emoji is a system emoji 702. An emoji is a system emoji if the systemEmojiStatus attribute on the emoji object is set to true. An emoji is an action emoji if the emoji object cast an actionEmoji passes. If the emoji is a system action emoji, then the emoji is processed 710.

In processing the system action emoji 710, the action of the emoji is obtained by calling the getAction( ) method on the system action emoji: emojiStream1[x].getAction (emojiStream1[x−1], emojiStream1[x+1])→document2;

Two parameters are used in the getAction( ) method:

The emoji before the system action emoji (emojiStream1[x−1])

The emoji after the system action emoji (emojiStream1[x+1])

The "x" iterator is incremented to skip the emoji in front of the system action emoji as it has been processed.

A new document is produced from the system action emoji, referred as document2 herein.

The system 104 combines two document files (the document of emojiStream1[x−1] and the document of emojiStream1[x+1] via the use of $3^{rd}$ party tools, or via programming of the current application, or via access to APIs of applications that merge documents.

For example, a Java tool called PDFMergeUtility allows for the merging of two PDF documents into a single, new file.

@Override
public void mergeFiles(File fileDir, File destFile) throws SearchLibException {
PDFMergerUtility pdfMerger=new PDFMergerUtility( );
File[ ] files=new LastModifiedFileComparator( )sort (fileDir.listFiles( );
for (File file: files) {
    String ext=FilenameUtils.getExtension(file.getName( );
    if (!"pdf".equalsIgnoreCase(ext))
    continue;
    pdfMerger.addSource(file);
}
if (destFile.exists( )
    destFile.delete( );
pdfMerger.setDestinationFileName(destFile.getAbsolutePath( );
try {
    pdfMerger.mergeDocuments( );
} catch (COSVisitorException e) {
    throw new SearchLibException(e);
} catch (IOException e) {
    throw new SearchLibException(e);
}
} pdfMerger is an object of the PDFMergerUtility class. The addSource( ) method adds a file to the list of files to merge. The setDestinationFileName( ) method sets the destination file name of the final, merged file. The mergeDocuments( ) of the PDFMergerUtility class merges the list of source documents.

The new document is placed into the emojiStream2 712:
emojiStream2[y]=createEmoji(document2)

If the emoji is not a system action emoji then a check is made if the emoji is a person emoji 704. This is determined by casting the emoji as a personEmoji, and if the cast does not fail, then the emoji of the originator is placed into the outgoing emoji stream, indexed by "y" 706:
emojiStream2[y]=originatorEmoji( )

If the emoji is not a person emoji, then the emoji is placed into the outgoing emoji stream, indexed by "y" 708:
emojiStream2[y]=emojiStream1[x];

At any of the flows, the iterator "y" is incremented prior to leaving the flow 714.

System Action Emojis Processing

System action emojis are emojis that are processed by the system, for example system 104. An emoji stream is received at the system 104 wherein the emojis are parsed and a determination is made if any emoji is a system action emoji. The system then executes code to perform the action of the system action emoji, and then forwards the emoji stream to recipient(s).

The current discussion of system action emojis covers the processing of certain system action emojis for examples. While it is impossible to cover all of the possible different action emojis that may be processed at the system 104, the examples will discuss the functionality surrounding the processing techniques. One versed in software development techniques will be able to use the overall techniques of processing action emojis in the system to develop other types of action emojis that are automatically processed in the system 104 without deviating from the scope of the current application.

As previously disclosed, when an emoji stream is received, a system action emoji, for example an "Insert" action emoji is placed in the stream after a document emoji, which is the document that is the source document, and before a document emoji which is document that is being inserted. By making this action emoji a system action emoji, the system is responsible for performing the action wherein normally the recipient(s) would be responsible.

Figure 8:
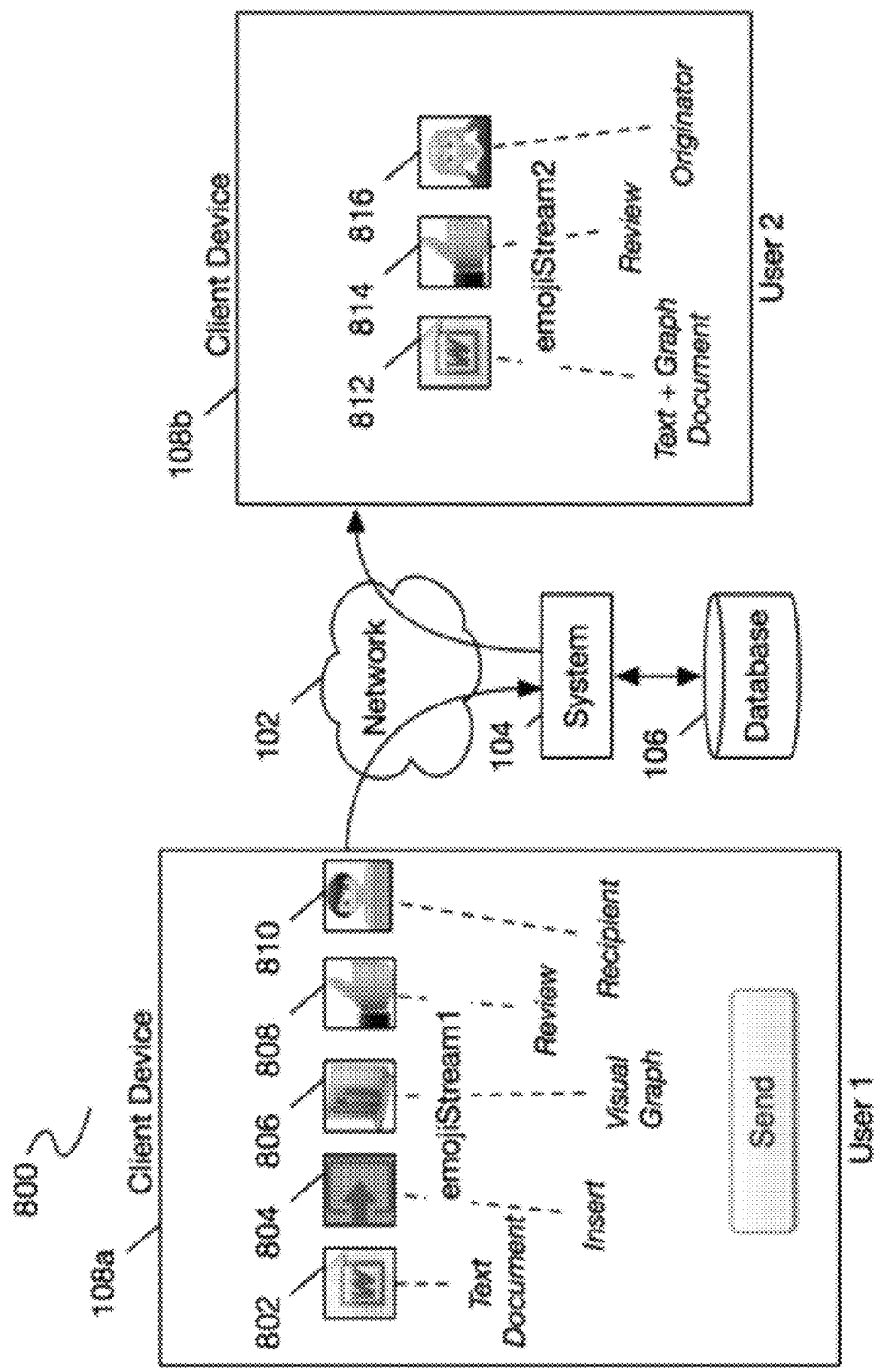
FIG. 8 depicts an example scenario of the flow of an emoji stream between two client devices.

FIG. 8 is an overall flow of data and client device GUI data 800 in an implementation of the current application. It shows two emoji streams: one in the originating client device 108a, and one in the receiving client device 108b. A system 102 is present and connected to a network 104 and a database 106 is present, connected to the system.

There are two client devices shown wherein client device 108a is the originator with user 1, and a client device 108b is the recipient with user 1. Other client devices may be present as well as depicted above 108c, and 108n. The client devices are connected to a network 102. These client devices may be a mobile device, a desktop computer, or any device containing a processor and memory, as further disclosed herein.

In the emoji stream of the originating client device 108a, at least one emoji may be set as a system emoji 804 by interaction with the user's pointing device, for example a finger. The functionality to convert an emoji into a system emoji is discussed herein.

When an emoji is a system emoji, it differs in appearance allowing the user to easily determine an emoji from a system emoji. For example, the turning of the emoji a color, for example a shaded color, is utilized for all system emojis.

In another embodiment, the emoji is outlined in a color, or blink, or turn flips on a time period, or be somewhat larger or smaller than other emojis, or any other appearance modification normally used in GUI design to highlight a component.

All emoji streams are routed to a system 104 through a network 102 wherein the emoji stream may be modified. The emoji stream is then routed to recipient(s) client devices through the network 102. The processing of the incoming emoji stream (emojiStream1) and creation of the outgoing emoji stream (emojiStream2) at the system 104 is further detailed herein.

The three emojis (802, 804, 806) in emojiStream1 are converted to a single emoji (812) in emojiStream2. The document 806 has been merged with document 802 via an insert action emoji 806, which was set as a system action emoji. Functionality of converting an emoji to a system emoji is further detailed herein.

The action emoji, review 808 is placed into the outgoing emoji stream, emojiStream2 814, and the final recipient person emoji 810 is replaced by the originating person emoji 816.

In another embodiment, the final emoji stream emojiStream2 contains an indication that the system performed functionality allowing the recipient(s) understand that the incoming document was not originated via the originator but was modified by the system 104. This indication may be a popup window, modification of the emojiStream2 such as an attribute added to an emoji object (i.e. the new document emoji 812) wherein the current application executing on the client device 108*b* parses the emoji object and obtains verification that the document emoji has been generated by the system 104. The current application executing on the client device 108*b* makes notification of this via text added in a text component on the display of the device 108*b*, or a popup window on the display of the client device 108*b*.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

The invention claimed is:

1. A method for utilizing clickable emojis for directing a system to perform certain actions, the method comprising:
   determining appropriate emojis on at least one user's originating device by interfacing with the application and data of the user's originating device;
   performing a search of the at least one user's data to obtain actions relevant to the at least one user of the system;
   determining an action associated with the emoji;
   setting at least one of the determined emojis as a system emoji; and
   transmitting the determined emojis from the user's originating device to a system network as an emoji stream, wherein an add icon placed at the end of the emoji stream allows additional emojis to be added to the current stream and further wherein the system network may modify such emoji stream before routing it to at least one recipient device.

2. The method of claim 1, wherein the appropriate emojis may be of participants, actions or documents.

3. The method of claim 1, wherein the data accessed may either be on the client device or located on a remote data base accessible by the system.

4. The method of claim 1, wherein files can be utilized as appropriate emojis by dropping at least one file over an application.

5. The method of claim 1, further comprising obtaining relevant actions of the at least one user by:
   performing a search for a particular action;
   determining the number of search elements returned;
   comparing the number of search elements returned to a static number; and
   utilizing the particular action as an action emoji if the number of search elements returned are greater than the static number.

6. The method of claim 1, wherein drop down components are used by the user to select different emojis previously determined by the system.

7. The method of claim 1, wherein an array of emojis of at least one of documents, actions and participants form the emoji stream.

8. The method of claim 1, wherein an emoji can be modified to be a system emoji by the selection of drop down elements displayed next to the emoji on the at least one user device.

9. The method of claim 1, wherein the system emoji performs an action of the emoji on another emoji.

10. The method of claim 1, wherein the system emoji differs in appearance from the other emojis in the emoji stream.

11. A system that utilizes clickable emojis to direct a system to perform certain actions the system comprising:
    at-least one processor; and
    a software agent operated by the processor and configured to:
    determine appropriate emojis on at least one user's originating device that interfaces with the application and data of the user's originating device;
    perform a search of the at least one user's data to obtain actions relevant to the at least one user of the system;
    determine an action associated with the emoji;
    set at least one of the determined emojis as a system emoji; and
    transmit the determined emojis from the user's originating device to a system network as an emoji stream, wherein an add icon placed at the end of the emoji stream allows additional emojis to be added to the current stream and further wherein the system network may modify such emoji stream before routing it to at least one recipient device.

12. The system of claim 11, wherein the appropriate emojis may be of participants, actions or documents.

13. The system of claim 11, wherein the data accessed may either be on the client device or within a remote data base.

14. The system of claim 11, wherein files can be utilized as appropriate emojis when at least one file is dropped over an application.

15. The system of claim 11, further comprising obtain relevant actions of the at least one user by:
    perform a search for a particular action;
    determine the number of search elements returned;
    compare the number of search elements returned to a static number; and
    utilize the particular action as an action emoji if the number of search elements returned are greater than the static number.

16. The system of claim 11, wherein drop down components are used by the user to select different emojis determined by the system.

17. The system of claim 11, wherein an array of emojis of at least one of documents, actions and participants form the emoji stream.

18. The system of claim 11, wherein an emoji can be modified to be a system emoji by the selection of drop down elements displayed next to the emoji on the user device.

19. The system of claim 11, wherein the system emoji performs an action of the emoji on another emoji.

20. A non-transitory computer readable medium encoded with computer program instructions that when executed by one or more computers cause the one or more computers to perform operations comprising:
   determining appropriate emojis on at least one user's originating device by interfacing with the application and data of the user's originating device;
   performing a search of the at least one user's data to obtain actions relevant to the at least one user of the system;
   determining an action associated with the emoji;
   setting at least one of the determined emojis as a system emoji; and
   transmitting the determined emojis from the user's originating device to a system network as an emoji stream, wherein an add icon placed at the end of the emoji stream allows additional emojis to be added to the current stream and further wherein the system network may modify such emoji stream before routing it to at least one recipient device.

\* \* \* \* \*